Patented July 7, 1931

1,813,120

UNITED STATES PATENT OFFICE

RAYMOND T. METZGER AND PAUL D. POTTER, OF WINNETKA, ILLINOIS, ASSIGNORS TO SPRAGUE, WARNER & COMPANY, OF CHICAGO, ILLINOIS, A CORPORATION

PROCESS FOR PREPARING AND PRESERVING THE BEVERAGE, TEA

No Drawing.  Application filed January 11, 1930.  Serial No. 420,291.

This invention relates to a process of preparing and preserving the beverage, tea, in such a way that it is of agreeable flavor, sound and satisfactorily clear and free from cloudiness and sediment at the time its preparation is completed, and when packed will not become contaminated with bacteria or become toxic on standing, or deposit sedimentary material or become cloudy, and is practically free from finely divided insoluble material which would tend to floculate on standing, and substantially free from colloidal or dissolved substances which would tend to coagulate and develop a cloudy appearance on standing, or develop an unsightly sediment through coagulation, flocculation or precipitation and which will remain sound, attractive, palatable and merchantable for an indefinite period of time.

It is well known that the beverage, tea, is made from tea and water, and that after it has been separated from the extracted leaves it can be packed hot in hermetically sealed containers or placed in such containers and subsequently processed in boiling water, in such a way as to impart to it a considerable degree of keeping quality against decomposition by certain types of bacteria. Such a product has never been commercially practicable, however, in part because it is more or less cloudy and unattractive in appearance and contains finely divided insoluble particles, coagulatable or colloidal material which cannot be removed in a practical way prior to packing by sedimentation and decantation, filtration or otherwise, and which with the passing of time will in part at least flocculate and precipitate in such a way as to render the product unattractive, unsightly and unmerchantable.

It is known, that a beverage prepared from tea leaves and water, packed in hermetically sealed containers and processed in boiling water for a reasonable time will possess such a high pH value, i. e. will be of such low hydrogen ion content or acidity, that unless acidified prior to processing by means of added acid or maintained at a low temperature after processing it will not remain sound but will undergo decomposition by certain spore-forming organisms not destroyed by the processing and will possibly become toxic and dangerous to life and health.

It has not heretofore been known, however, that heating the beverage, tea, under pressure to temperature above the boiling point of water for suitable periods of time prior to packing will without impairing the flavor of the tea, result in rapid precipitation of the material which causes the beverage, tea, as ordinarily brewed to appear more or less cloudy and to slowly deposit sediment at the bottom of the container, and that subsequently the precipitated material can be removed from the beverage by sedimentation and decantation, or siphoning, filtration or otherwise to the end that the beverage, tea, of agreeable flavor is prepared, minus those cloud and sediment forming principles, which can be acidified, packed in hermetically sealed containers and processed at comparatively low temperatures, or which can be packed in hermetically sealed containers and sterilized with heat, to the end that it will be clear and which will not develop material quantities of sediment and which will be attractive, safe, sound, palatable and merchantable for an indefinite period of time.

Likewise it has not heretofore been known or demonstrated that the operation of brewing tea and the operation of rapidly precipitating the substances which cause the beverage to be cloudy and sedimentitious can be combined in one operation by brewing the beverage for a suitable period of time under pressure at a temperature above that of boiling water. These things which have not heretofore been known concerning the preparation and packing of the beverage, tea, constitute the essential parts of our discovery.

In practicing our invention, it is only necessary to place the desired quantities of tea and water in a satisfactory container and to heat the mixture for a suitable period of time at a suitable temperature above the boiling point of water, or to brew the tea in the customary manner, decant the beverage from the extracted leaves, subject the drawn off beverage under pressure to a temperature above that of boiling water for a satisfactory period of time, filter or allow to stand and subsequently decant, siphon or otherwise remove the supernatant liquid and then in either case to acidify or not with an edible acid such as citric acid as may be desired, heat the beverage obtained and pack, if desired, in hermetically sealed containers or pack it hot or cold, with suitable head space, in partial vacuum or under atmospheric pressure, in such containers and process at a temperature and for a period of time depending upon the acidity of the beverage, but sufficient to ensure the absence of bacterial development.

It is possible to make certain modifications in the above procedure, as for example, it is more or less optional and unimportant as to what point in the procedure shall be selected for the addition of harmless acid, or sugar or both, if such additions are to be made, but such optional modifications are considered a part of our knowledge and experience, and, therefore, included in the scope of the invention.

In practicing our invention, we prefer to place tea and hot water in large earthenware containers which can be temporarily hermetically sealed. These are placed unsealed in a retort, the retort is closed and the air contained is blown out through a pet cock by admitting steam through a convenient valve. The pet cock is then closed and steam is further admitted until the temperature within the retort is approximately 240° F. and the pressure approximately 10 lbs. per square inch above atmospheric pressure (or approximately 25 lbs. per square inch absolute). This condition of temperature and pressure is maintained until the centers of the containers have been subjected to approximately the retort temperature for one-half to one hour, or at times longer depending upon the variety of tea used. The containers are then removed from the retort, sealed while hot, and allowed to stand for twenty-four hours. The clear liquid is then siphoned off, heated and packed hot in ordinary hermetically sealed beverage bottles and finally sterilized in the bottles by heating them with steam under pressure and at a temperature of 240° F. for one-half hour. In expressing our preference as set forth in this paragraph, let it be understood that the details as outlined are not specifically required or necessary.

What we claim is:

1. The process of preparing and preserving the beverage, tea, comprising: extracting tea with water, subjecting the aqueous extract of tea while under adequate pressure to a temperature above that of boiling water for a time interval sufficient to bring about rapid coagulation, flocculation and precipitation of the substances which give rise to cloudiness and sediment, separating the clarified liquid from the coagulated, flocculated or precipitated substances, and subjecting the separated liquid, in sealed containers, to bactericidal treatment.

2. In process of preparing and preserving the beverage, tea, the step of: subjecting the aqueous extract of tea while under adequate pressure to a temperature above that of boiling water for a time interval sufficient to bring about rapid coagulation, flocculation and precipitation of the substances which give rise to cloudiness and sediment.

In testimony whereof we affix our signatures.

RAYMOND T. METZGER.
PAUL D. POTTER.